US008293151B2

(12) United States Patent
Lahoda et al.

(10) Patent No.: US 8,293,151 B2
(45) Date of Patent: Oct. 23, 2012

(54) TRIURANIUM DISILICIDE NUCLEAR FUEL COMPOSITION FOR USE IN LIGHT WATER REACTORS

(75) Inventors: Edward J. Lahoda, Pittsburgh, PA (US); Radu Pomirleanu, Sewickley, PA (US); Sumit Ray, Columbia, SC (US); Lars Hallstadius, Vasteras (SE)

(73) Assignee: Westinghouse Electric Company LLC, Cranberry Township, PA (US)

( * ) Notice: Subject to any disclaimer, the term of this patent is extended or adjusted under 35 U.S.C. 154(b) by 145 days.

(21) Appl. No.: 12/827,237

(22) Filed: Jun. 30, 2010

(65) Prior Publication Data

US 2012/0002778 A1 Jan. 5, 2012

(51) Int. Cl.

| | |
|---|---|
| ***G21C 3/00*** | (2006.01) |
| ***G21G 4/00*** | (2006.01) |
| ***C09K 11/04*** | (2006.01) |
| ***B21D 9/00*** | (2006.01) |

(52) U.S. Cl. ........ 252/636; 376/409; 376/422; 376/421; 422/249

(58) Field of Classification Search .................. 376/409, 376/422, 421; 252/625, 636; 422/249; 423/249, 423/250

See application file for complete search history.

(56) References Cited

U.S. PATENT DOCUMENTS

2007/0064861 A1* 3/2007 Sterbentz ...................... 376/409

* cited by examiner

*Primary Examiner* — Erin M Leach

(57) ABSTRACT

The present invention relates to nuclear fuel compositions including triuranium disilicide. The triuranium disilicide includes a uranium component which includes uranium-235. The uranium-235 is present in an amount such that it constitutes from about 0.7% to about 5% by weight based on the total weight of the uranium component of the triuranium disilicide. The nuclear fuel compositions of the present invention are particularly useful in light water reactors.

10 Claims, 4 Drawing Sheets

TRIURANIUM DISILICIDE NUCLEAR FUEL COMPOSITION FOR USE IN LIGHT WATER REACTORS

FIELD OF THE INVENTION

The present invention relates to light water reactors, and in particular, to uranium fuel compositions for use in light water reactors.

BACKGROUND OF THE INVENTION

Light water reactors ("LWRs") can include pressurized water reactors ("PWRs") and boiling water reactors ("BWRs"). In a PWR, for example, the reactor core includes a large number of fuel assemblies, each of which is composed of a plurality of elongated fuel elements or rods. The fuel rods each contain fissile material, such as uranium dioxide ("$UO_2$"), usually in the form of a stack of nuclear fuel pellets; although, annular or particle forms of fuel are also used. The fuel rods are grouped together in an array which is organized to provide a neutron flux in the core sufficient to support a high rate of nuclear fission, and thus, the release of a large amount of energy in the form of heat. A coolant, such as water, is pumped through the core in order to extract some of the heat generated in the core for the production of useful work. Fuel assemblies vary in size and design depending on the desired size of the core and the size of the reactor.

When a new reactor starts, its core is often divided into a plurality, e.g., three or more groups of assemblies which can be distinguished by their position in the core and/or their enrichment level. For example, a first batch or region may be enriched to an isotopic content of 2.0% uranium-235. A second batch or region may be enriched to 2.5% uranium-235, and a third batch or region may be enriched to 3.5% uranium-235. After about 10 to 24 months of operation, the reactor is typically shut down, and the first fuel batch is removed and replaced by a new batch, usually of a higher level of enrichment (up to a preferred maximum level of enrichment). Subsequent cycles repeat this sequence at intervals in the range of from about 8 to 24 months. Refueling, as described above, is required because the reactor can operate as a nuclear device only so long as it remains a critical mass. Thus, nuclear reactors are provided with sufficient excess reactivity at the beginning of a fuel cycle to allow operation for a specified time period, usually between about 6 to 18 months.

Conventional fuel pellets for use in PWRs, for example, are typically fabricated by compressing suitable powders into a generally cylindrical mold. The compressed material is sintered, which results in a substantial reduction in volume. The resulting pellet is generally cylindrical and often has concave surfaces at each end as a result of the compression. The fuel pellets are typically composed of uranium dioxide. The uranium component of the uranium dioxide includes uranium-238 and uranium-235. Typically, the fuel composition of the pellets includes a large amount of uranium-238 and a small amount of uranium-235. For example, a conventional fuel pellet can include a maximum of less than 5% by weight of uranium-235 with the remainder of the uranium in the uranium component composed of uranium-238.

The percentage of uranium-235 in the fuel composition of the pellet can be increased as follows: (i) by using a greater percentage, e.g., greater than 5% by weight (which is currently the licensed limit for many nuclear fuel fabrication facilities), of uranium-235 in the fuel composition or (ii) by increasing the density of the fuel composition to allow for a larger amount of uranium-235. A higher percentage of uranium-235 in the fuel pellet composition can provide economic benefits, such as longer fuel cycles and/or the use of fewer new fuel assemblies during batch replacement of a region. Further, higher thermal conductivity, if it can be obtained, will enable higher thermal duty.

Thus, there is a need to increase the content of uranium-235 and to increase the thermal conductivity of uranium-containing fuel compositions.

SUMMARY OF THE INVENTION

In one aspect, the present invention provides a nuclear fuel composition which includes triuranium disilicide. The triuranium disilicide has a uranium component which includes uranium-235. The uranium-235 is present in an amount such that it constitutes from about 0.7% to about 5% by weight based on the total weight of the uranium component of the triuranium disilicide.

In another aspect, the present invention provides a fuel assembly including a plurality of fuel rods. Each fuel rod contains a plurality of nuclear fuel pellets. The composition of each of the nuclear fuel pellets includes triuranium disilicide. The triuranium disilicide has a uranium component which includes uranium-235. The uranium-235 is present in an amount such that it constitutes from about 0.7% to about 5% by weight based on the total weight of the uranium component of the triuranium disilicide.

In still another aspect, the present invention provides a light water reactor having a fuel assembly. The fuel assembly includes a plurality of fuel rods, and each fuel rod contains a plurality of nuclear fuel pellets. The composition of each of the nuclear fuel pellets includes triuranium disilicide. The triuranium disilicide has a uranium component which includes uranium-235. The uranium-235 is present in an amount such that it constitutes from about 0.7% to about 5% by weight based on the total weight of the uranium component of the triuranium disilicide.

BRIEF DESCRIPTION OF THE DRAWINGS

The invention as set forth in the claims will become more apparent from the following detailed description of certain preferred practices thereof illustrated, by way of example only, and the accompanying drawings wherein;

DETAILED DESCRIPTION OF THE INVENTION

Figure 1:
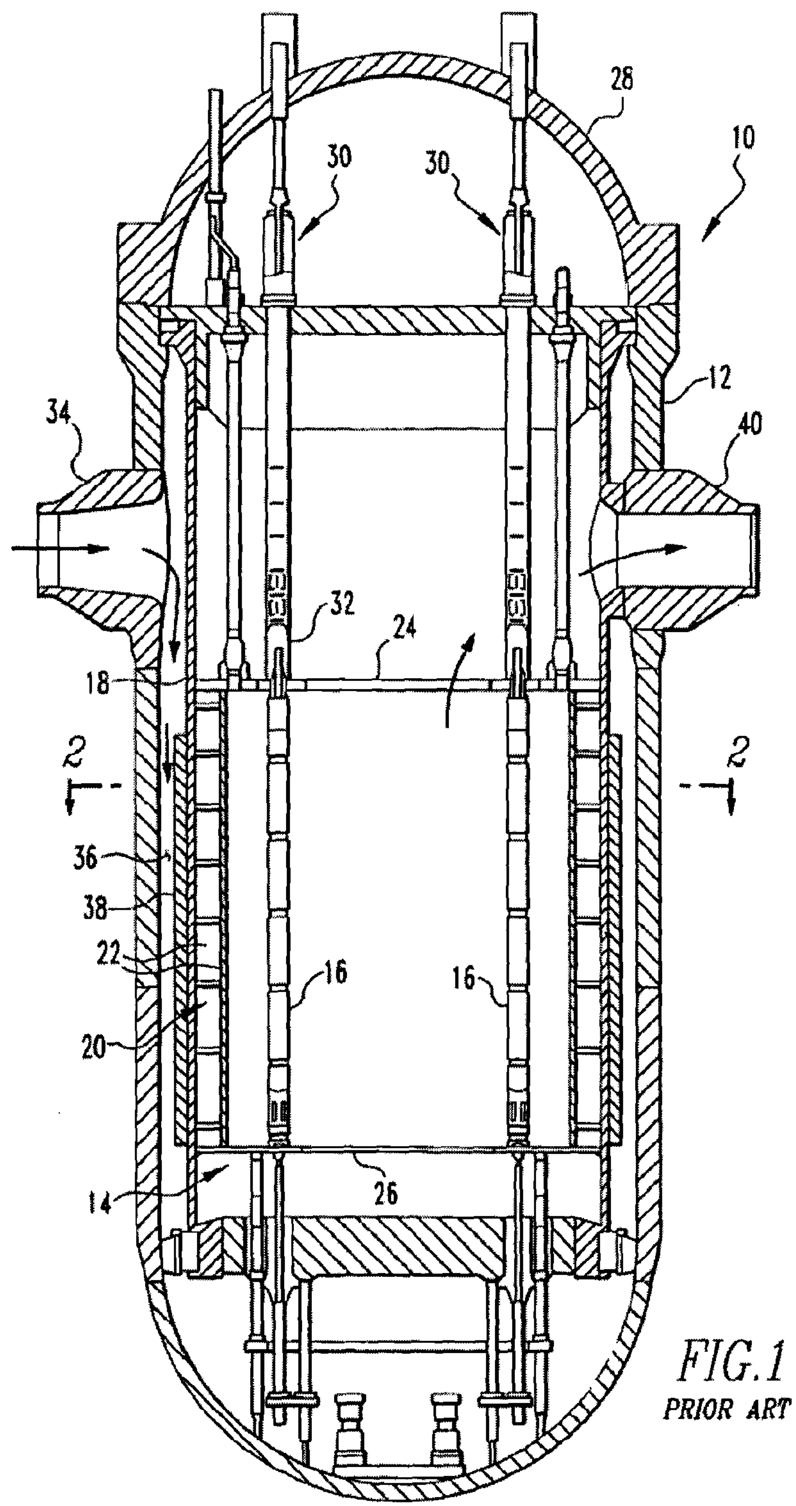
FIG. 1 is a longitudinal view, partly in section and partly in elevation, of a prior art nuclear reactor to which the present invention may be applied.

The present invention relates to nuclear fuel compositions including triuranium disilicide for use in light water reactors ("LWRs"). The present invention is applicable to a variety of LWRs, including but not limited to, pressurized water reactors ("PWRs") and boiling water reactors ("BWRs"). However, for simplicity in describing the details of the invention, the following description referring to the drawings will be in accordance with a PWR.

In the following description, like reference numerals designate like or corresponding parts throughout the several views. Also in the following description, it is to be understood that such terms as "forward," "rearward," "left," "right," "upwardly," "downwardly," and the like, are words of convenience and are not to be construed as limiting terms.

Figure 2:
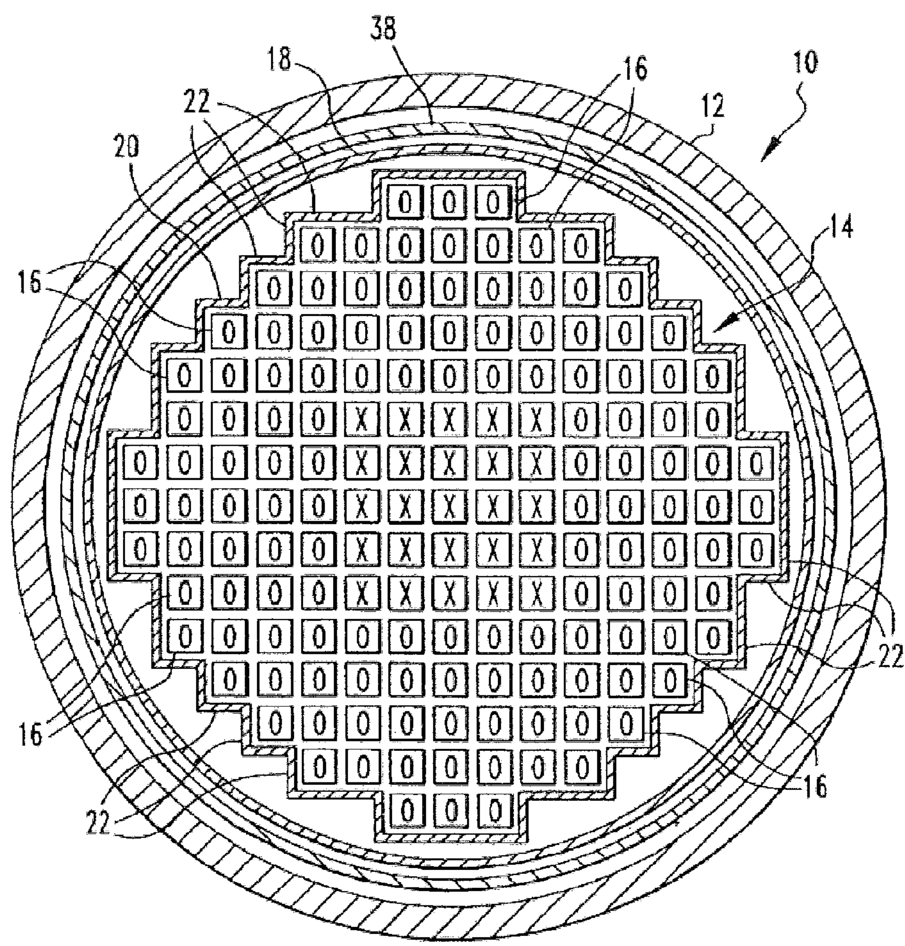
FIG. 2 is a simplified enlarged plan view of the reactor taken along line 2-2 of FIG. 1, but with its core having a construction and arrangement of fuel in accordance with the present invention.

Referring now to the drawings, and particularly to FIGS. 1 and 2, there is shown an embodiment of the present invention, by way of example only and one of many suitable reactor types, a PWR being generally designated by the numeral 10. The PWR 10 includes a reactor pressure vessel 12 which houses a nuclear reactor core 14 composed of a plurality of elongated fuel assemblies 16. The relatively few fuel assemblies 16 shown in FIG. 1 is for purposes of simplicity only. In reality, as schematically illustrated in FIG. 2, the reactor core 14 is composed of a great number of fuel assemblies.

Spaced radially inwardly from the reactor pressure vessel 12 is a generally cylindrical core barrel 18, and within the barrel 18 is a former and baffle system, hereinafter called a baffle structure 20, which permits transition from the cylindrical barrel 19 to a squared-off periphery of the reactor core 14 formed by the plurality of fuel assemblies 16 being arrayed therein. The baffle structure 20 surrounds the fuel assemblies 16 of the reactor core 14. Typically, the baffle structure 20 is made of plates 22 joined together by bolts (not shown). The reactor core 14 and the baffle structure 20 are disposed between upper and lower core plates 24, 26, which, in turn, are supported by the core barrel 18.

The upper end of the reactor pressure vessel 12 is hermetically sealed by a removable closure head 28 upon which are mounted a plurality of control rod drive mechanisms 30. Again, for simplicity, only a few of the many control rod drive mechanisms 30 are shown. Each drive mechanism 30 selectively positions a rod cluster control mechanism 32 above and within some of the fuel assemblies 16.

A nuclear fission process carried out in the fuel assemblies 16 of the reactor core 14 produces heat which is removed during operation of the PWR 10 by circulating a coolant fluid, such as light water with soluble boron, through the reactor core 14. More specifically, the coolant fluid is typically pumped into the reactor pressure vessel 12 through a plurality of inlet nozzles 34 (only one of which is shown in FIG. 1). The coolant fluid passes downward through an annular region 36 defined between the reactor pressure vessel 12 and core barrel 18 (and a thermal shield 38 on the core barrel) until it reaches the bottom of the reactor pressure vessel 12, where it turns 180 degrees prior to following up through the lower core plate 26 and then up through the reactor core 14. On flowing upwardly through the fuel assemblies 16 of the reactor core 14, the coolant fluid is heated to reactor operating temperatures by the transfer of heat energy from the fuel assemblies 16 to the fluid. The hot coolant fluid then exits the reactor pressure vessel 12 through a plurality of outlet nozzles 40 (only one being shown in FIG. 1) extending through the core barrel 18. Thus, heat energy, which the fuel assemblies 16 impart to the coolant fluid, is carried off by the fluid from the reactor pressure vessel 12.

Due to the existence of holes (not shown) in the core barrel 18, coolant fluid is also present between the barrel 18 and the baffle structure 20 and at a higher pressure than within the reactor core 14. However, the baffle structure 20, together with the core barrel 19 separate the coolant fluid from the fuel assemblies 16 as the fluid flows downwardly through the annular region 36 between the reactor pressure vessel 12 and core barrel 18.

Figure 3:
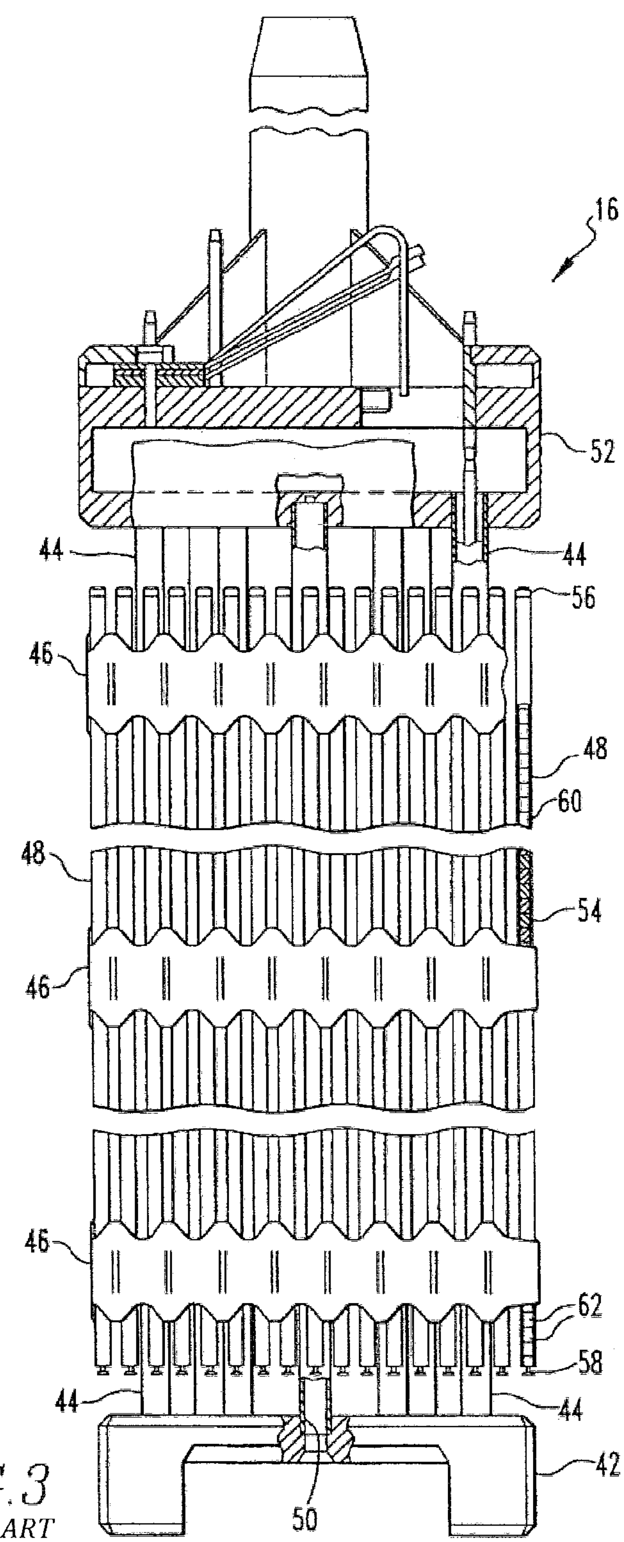
FIG. 3 is an elevational view, with parts sectioned and parts broken away for clarity, of one of the nuclear fuel assemblies in the reactor of FIG. 2, the fuel assembly being illustrated in a vertically foreshortened form.

As briefly mentioned above, the reactor core 14 is composed of a large number of elongated fuel assemblies 16. Turning to FIG. 3, each of the fuel assemblies 16, being of the type used in the PWR 10, basically includes a lower end structure or bottom nozzle 42 which supports the assembly on the lower core plate 26 and a number of longitudinally extending guide tubes or thimbles 44 which project upwardly from the bottom nozzle 42. Each of the fuel assemblies 16 further includes a plurality of transverse support grids 46 axially spaced along the lengths of the guide thimbles 44 and attached thereto. The grids 46 transversely space and support a plurality of fuel rods 48 in an organized array thereof. Also, each of the fuel assemblies 16 has an instrumentation tube 50 located in the center thereof and an upper end structure or top nozzle 52 attached to the upper ends of the guide thimbles 44. With such an arrangement of parts, each of the fuel assemblies 16 forms an integral unit capable of being conveniently handled without damaging the assembly parts.

Figure 4:
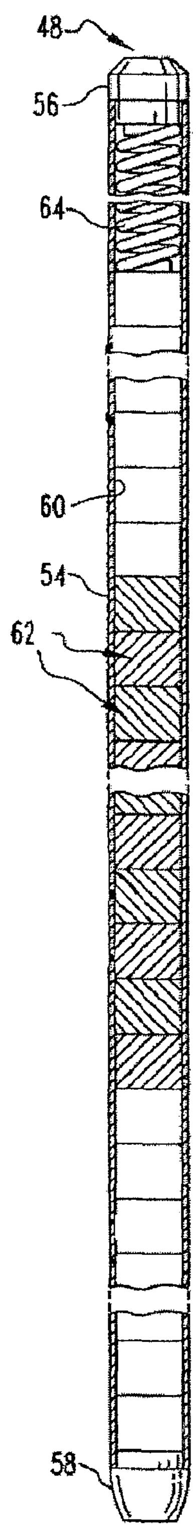
FIG. 4 is an enlarged foreshortened longitudinal axial sectional view of a fuel rod of the fuel assembly of FIG. 3 containing fuel pellets.

As seen in FIGS. 3 and 4, each of the fuel rods 48 of the fuel assemblies 16 has an identical construction insofar as each includes an elongated hollow cladding tube 54 with a top end plug 56 and a bottom end plug 58 attached to and sealing opposite ends of the tube 54 defining a sealed chamber 60 therein. A plurality of nuclear fuel pellets 62 is placed in an end-to-end abutting arrangement or stack within the chamber 60 and biased against the bottom end plug 58 by the action of a spring 64 placed in the chamber 60 between the top of the pellet stack and the top end plug 56.

As previously mentioned, conventional nuclear fuel compositions for use in LWRs include uranium dioxide. The uranium dioxide contains a significant amount of uranium-238 and a small amount of uranium-235. Further, as previously mentioned, there are economic benefits of increasing the content of uranium-235 in nuclear fuel compositions. Such benefits can include longer fuel cycles or the use of smaller batches. In addition, if a higher thermal conductivity can be obtained, then higher thermal duty can result therefrom. Thus, to increase the amount of uranium-235 in a nuclear fuel composition, the present invention employs triuranium disilicide. In general, the density of triuranium disilicide is greater than the density of uranium dioxide. The density of triuranium disilicide is 12.2 grams/cm$^3$ and the density of uranium dioxide is 10.96 grams/cm$^3$. Without intending to be bound by any particular theory, it is believed that the increase in density, as a result of using triuranium disilicide to replace all or a portion of uranium dioxide typically used in conventional fuel pellets, results in improved nuclear plant performance by enabling longer fuel cycles and/or higher power ratings. For example, the use of triuranium disilicide in a nuclear fuel composition can allow the uranium-235 content in a nuclear fuel assembly to increase by about 11% percent by weight with an increase in thermal conductivity of between 3 and 5 times, as compared to that obtained with the use of uranium dioxide.

In the present invention, triuranium disilicide at least partially replaces the uranium dioxide content that is typically present in conventional nuclear fuel compositions. The amount of triuranium disilicide can vary. In one embodiment, the triuranium disilicide completely replaces the uranium dioxide content in the nuclear fuel composition. In alternate embodiments, the triuranium disilicide is present in an amount such that it constitutes from about 80% to about 100% by weight, or from about 50% to about 100% by weight, of the total weight of the nuclear fuel composition.

In other embodiments, in addition to triuranium disilicide, the nuclear fuel composition can also include triuranium silicide, triuranium trisilicide, and combinations thereof. In one embodiment, the nuclear fuel composition substantially comprises triuranium disilicide and only trace amounts of triuranium silicide, triuranium trisilicide, and combinations thereof.

The triuranium disilicide includes a uranium component. The uranium component can include various uranium isotopes, such as, but not limited to, uranium-238, uranium-236, uranium-235, uranium-234, uranium-233, uranium-232, and mixtures thereof. In one embodiment, the uranium component of the triuranium disilicide substantially includes uranium-238 and uranium-235, and optionally, trace amounts of uranium-236 and uranium-232. In another embodiment, the uranium component of the triuranium disilicide includes uranium-235 in an amount such that it constitutes from about 0.7% to about 5% by weight based on the total weight of the uranium component of the triuranium disilicide.

In one embodiment, the percentage of uranium-235 in the triuranium disilicide can depend on the amount of uranium-235 needed to replace the uranium-235 in current fuel rods which include uranium dioxide fuel compositions. In another embodiment, the percentage of uranium-235 in the triuranium disilicide is a maximum, such as from about 4.95% to about 5.00%, and the number of fuel assemblies in the batch is reduced or minimized.

The nuclear fuel composition of the present invention can be in various forms, such as, but not limited to, nuclear fuel pellets. The nuclear fuel pellets can be vertically stacked in a fuel rod (as shown in FIG. 4) which is part of a fuel assembly of a pressurized water reactor.

Powdered triuranium disilicide has been used in test reactors which operate at a temperature of less than about 100° C. and with the powdered triuranium disilicide dispersed in aluminum metal to maintain the fuel relatively cool and protect the fuel from exposure to the coolant. However, triuranium disilicide has not been considered a suitable fuel for commercial operation of LWRs, such as PWRs, because of its potential to react with water (e.g., coolant in the reactor core) and because of its relatively low melting point (about 1665° C. for triuranium disilicide as compared to about 2750° C. for uranium dioxide).

Moreover, another reason for considering triruranium disilicide to be unsuitable for use in nuclear fuel compositions is its relatively low melting point (1662° C.) as compared to uranium dioxide (2847° C.). The expected operating temperature of triuranium disilicide was evaluated for the maximum power densities at which uranium dioxide fuel compositions are operated. The results indicated that triuranium disilicide has greater capability than uranium dioxide when employed at the normal operating temperatures of LWRs. For example, a cylinder is assumed to have uniform internal heating, q, and constant thermal conductivity, k. The centerline temperature is calculated according to Formula I:

$$T_{centerline}=T_{surface}+q^*((D^*D)/k)/4 \quad \text{(I)}$$

wherein for uranium dioxide:

maximum $T_{centerline}$ (melting point temperature) is 2846.85° C.;

$T_{surface}$ is 400° C.;

D (i.e., pellet diameter) is 0.322 inches (0.819 cm); and k is 0.03 W/cm/° C.

The maximum volumetric heat generation rate, q, for uranium dioxide is calculated according to Formula II:

$$q=(T_{centerline}-T_{surface})^*4^*(k/(D^*D))$$

$$q=(2846.85° \text{ C.}-400° \text{ C.})^*4^*(0.03/(0.819^*0.819))=438 \text{ w/cm}^3 \quad \text{(II)}$$

If the same volumetric heat generation rate, q, is used for triuranium disilicide, the $T_{centerline}$ is calculated according to Formula I above:

wherein for triuranium disilicide, $T_{surface}$ is 400° C.;

q is 438 w/cm$^3$

D (i.e., pellet diameter) is 0.322 inches (0.819 cm); and k=0.15 W/cm/° C.

$T_{centerline}$=400° C.+(438*((0.819*0.819)0.15)/4)

$T_{centerline}$=890° C.

At the same value of q for both uranium dioxide and triuranium disilicide, the calculated centerline temperature for triuranium disilicide is 890° C. which is 772° C. below the melting temperature (1662° C.) of triuranium disilicide. Thus, in accordance with the above calculations, triuranium disilicide is shown to have a higher heat flux capability than uranium dioxide. The higher the operating temperature, the higher the centerline temperature. Therefore, the normal operating temperature (e.g., of a LWR, such as a PWR) should be maintained relatively low such that during upset conditions, the centerline temperature does not exceed the melting point of triuranium disilicide. In one embodiment, the nuclear fuel composition of the present invention, which includes triuranium disilicide, is employed in an LWR, such as a PWR, wherein the normal operating temperature does not exceed about 900° C.

In another embodiment, a fuel pellet composition including triuranium disilicide has an increased number density (atoms/cm$^3$) of uranium-235 as compared to the fuel composition including uranium dioxide, wherein the enrichment level of U-235 is the same for both compositions (5.06 atom %). For example, the number density of uranium-235 for uranium dioxide was calculated as follows:

10.96 g $UO_2$/cm$^3$*(1 mole $UO_2$/(238+(16*2) g $UO_2$)*0.6023E24 molecules $UO_2$/mole $UO_2$*1 atom U/molecule $UO_2$*0.0506 atoms U-235/atoms U=1.237E21 atoms of U-235/cm$^3$.

The number density of uranium-235 for triuranium disilicide was calculated as follows:

12.2 g $U_3Si_2$/cm$^3$*(1 mole $U_3Si_2$/((238*3)+(28*2) g $U_3Si_2$)*0.6023E24 molecules $U_3Si_2$/mole $U_3Si_2$*3 atom U/molecule $U_3Si_2$*0.0506 atoms U-235/atoms U=1.449E21 atoms of U-235/cm$^3$.

As shown above, the use of triuranium disilicide in place of uranium dioxide in a fuel pellet composition results in a 17% increase in number density (atoms/cm$^3$) of uranium-235 when the enrichment level of uranium-235 remains the same for the triuranium disilicide and uranium dioxide fuel pellet compositions (e.g., the enrichment level of uranium-235 is kept constant). In an alternate embodiment, the percent increase in number density of uranium-235 is from 10% to 17% when triuranium disilicide is used, as compared to the use of uranium dioxide in a fuel pellet composition.

Whereas particular embodiments of the invention have been described herein for purposes of illustration, it will be evident to those skilled in the art that numerous variations of the details may be made without departing from the invention as set forth in the appended claims.

What is claimed is:

1. A nuclear fuel composition comprising: triuranium silicide, triuranium trisilicide, and triuranium disilicide which comprises a uranium component, the uranium component comprising uranium-235 wherein the uranium-235 is present in an amount such that it constitutes from about 0.7% to about 5% by weight based on the total weight of the uranium component of the triuranium disilicide.

2. The nuclear fuel composition of claim 1, wherein the triuranium disilicide constitutes from about 80% to about 100% by weight of the total weight of the fuel composition.

3. The nuclear fuel composition of claim 1, wherein the triuranium disilicide constitutes from about 50% to about 100% by weight of the total weight of the fuel composition.

4. The nuclear fuel composition of claim 1, wherein the uranium component further comprises uranium isotopes selected from the group consisting of uranium-232, uranium-233, uranium-234, uranium-236, uranium-238, and mixtures thereof.

5. The nuclear fuel composition of claim 1, wherein said composition is in the form of a pellet.

6. The nuclear fuel composition of claim 1, wherein said nuclear fuel composition has a number density of uranium-235 of from about 10% to about 17% higher, as compared to a nuclear fuel composition including uranium dioxide as a replacement for the triuranium disilicide and having the same percentage by weight of uranium-235.

7. A fuel assembly comprising a plurality of fuel rods, each fuel rod containing a plurality of nuclear fuel pellets, wherein the composition of each of the nuclear fuel pellets comprises triuranium silicide, triuranium trisilicide, and triuranium disilicide which comprises a uranium component, the uranium component comprising uranium-235, wherein the uranium-235 is present in an amount such that it constitutes from about 0.7% to about 5% by weight based on the total weight of the uranium component of the triuranium disilicide.

8. The fuel assembly of claim 7, wherein the triuranium disilicide constitutes from about 80% to about 100% by weight of the total weight of each of the fuel pellets.

9. A light water reactor having a fuel assembly, the fuel assembly comprising a plurality of fuel rods, each fuel rod containing a plurality of nuclear fuel pellets, wherein the composition of each of the nuclear fuel pellets comprises triuranium silicide, triuranium trisilicide, and triuranium disilicide which comprises a uranium component, the uranium component comprising uranium-235, wherein the uranium-235 is present in an amount such that it constitutes from about 0.7% to about 5% by weight based on the total weight of the uranium component of the triuranium disilicide.

10. The light water reactor of claim 9, wherein a normal operating temperature does not exceed about 900° C.

* * * * *